May 13, 1958 S. R. TANNER ET AL 2,834,955
RADAR SYSTEMS
Filed Sept. 22, 1952 2 Sheets-Sheet 1
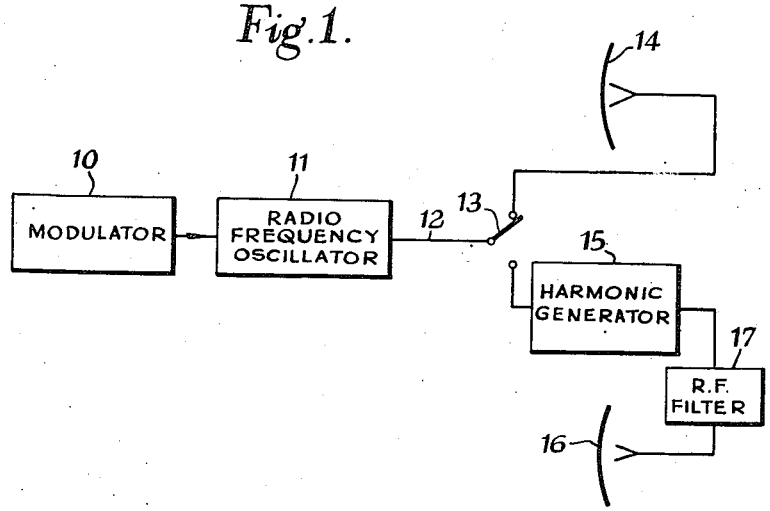
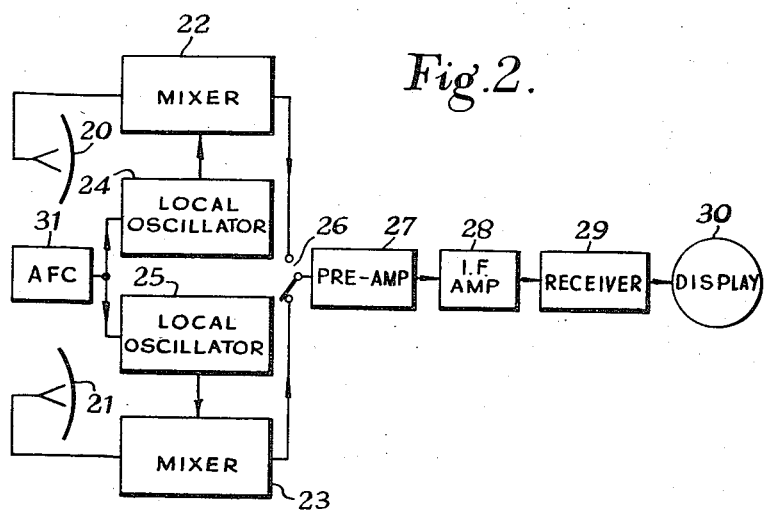
INVENTORS
STANLEY REES TANNER
RONALD LAWRENCE BURR
BY
ATTORNEY

INVENTORS
STANLEY REES TANNER
RONALD LAWRENCE BURR
BY
ATTORNEY

United States Patent Office 2,834,955
Patented May 13, 1958

2,834,955
RADAR SYSTEMS

Stanley Rees Tanner and Ronald Lawrence Burr, London, England, assignors to The Decca Record Company Limited, London, England, a British company Application September 22, 1952, Serial No. 310,806

Claims priority, application Great Britain December 17, 1951

10 Claims. (Cl. 343—5)

This invention relates to radar systems in which pulse or frequency modulated radio frequency signals are radiated by a transmitter and echoes of these transmitted signals are received by a receiver.

According to this invention, a radar system comprises means for generating pulse or frequency modulated radio frequency signals, a harmonic generator coupled to the modulated signal generating means and arranged, on excitation by the modulated signals, to produce correspondingly modulated signals of a different and higher radio frequency which is a harmonic of the exciting radio frequency, radiating means for radiating the higher frequency signals and a receiver for receiving echoes of the radiated signals. This arrangement enables a radar system to be operated on a higher frequency than is available from the oscillation generator. For example, a magnetron oscillating at 10,000 mc./s. might be used to generate radio frequency pulses which are then applied to a harmonic generator for producing the fourth harmonic of the applied signal, that is signals of a frequency of 40,000 mc./s.

This arrangement also makes it readily possible to construct a radar system for operating on two or more widely different frequencies. For example, means may be provided for directly radiating the pulse or frequency modulated radio frequency signals generated by the signal generating means either alternatively to or simultaneously with the higher frequency signals. This is of particular advantage with the very high frequencies which may now be used for radar systems. It is well known that for a given size of antenna system, increase of frequency enables a narrower beam width to be obtained for a directional radiated beam. Thus it is generally advantageous, for the purpose of obtaining better definition in the radar display, to use the highest frequency possible. However, the effective use of the highest frequencies, such as are now possible, is dependent on weather conditions and this is a serious drawback to the employment of the highest frequencies unless an alternative lower frequency radar system is available.

In one arrangement in which the aforesaid signal generating means comprises a magnetron and in which a waveguide is provided for coupling the magnetron to an antenna system for radiating the magnetron output, a wave guide switch may be provided in the waveguide arranged so that the magnetron output can be fed directly to the antenna system or to the harmonic generator. A radio frequency filter may be interposed between the harmonic generator and the radiating means, which filter is arranged to provide a transmitting path for signals of the desired harmonic frequency and to reflect or to absorb signals of the fundamental frequency or of other undesired harmonic frequencies which may be present in the output of the harmonic generator.

In a radar system arranged for radiating on two different frequencies a common antenna may be provided for radiating the signals of the two different frequencies or two separate antenna systems may be provided. If the two frequencies are to be radiated alternatively, the receiver may be provided with a common display unit for the received signals of the two different frequencies.

The receiver may be a straight receiver, that is to say without any frequency changing before the final detector, or it may be of the super-heterodyne type. In the latter case, a common intermediate frequency amplifier may be used for received signals of two different alternative frequencies.

For a super-heterodyne receiving system, the local oscillator for the higher frequency receiving stage may comprise an oscillator of frequency considerably lower than said higher frequency, coupled to a harmonic generator. A common automatic frequency-control may be arranged to control the local oscillators for the frequency changers for both received frequency signals.

It will be appreciated also that, for a super-heterodyne type of receiver, it would be possible to have a common local oscillator for the signals of the two different frequencies, a harmonic generator being provided for converting part of the local oscillator output to the necessary higher frequency. In this case, however, the resultant intermediate frequencies would generally be different and separate intermediate frequency amplifier stages would be required for the two received signals.

The invention also includes within its scope, a transmitter for a radar system comprising means for generating pulse or frequency modulated signals and a harmonic generator coupled to the modulated signal generating means and arranged, on excitation by the modulated signals, to produce correspondingly modulated signals of a different higher radio frequency which is a harmonic of the exciting radio frequency.

In one arrangement, the transmitter comprises a modulator and a magnetron oscillator for generating pulse or frequency modulated radio frequency signals and a harmonic generator excited by the magnetron output to produce correspondingly modulated signals of a different higher radio frequency.

It will be appreciated that any non-linear electronic device, for example a crystal or a diode, can act as a harmonic generator. Preferably for the purposes of the present invention the harmonic generator is constructed so as to enhance the required harmonic content and a co-axial line diode, with waveguide couplings for coupling to a waveguide system is very suitable for this purpose.

The following is a description of a number of embodiments of the invention reference being made to the accompanying drawings in which:

Figure 1 is a block schematic diagram of a transmitter for a radar system.

Figures 2, 3 and 4 are block schematic diagrams of alternative forms of receiving apparatus for the radar system.

Figure 3:
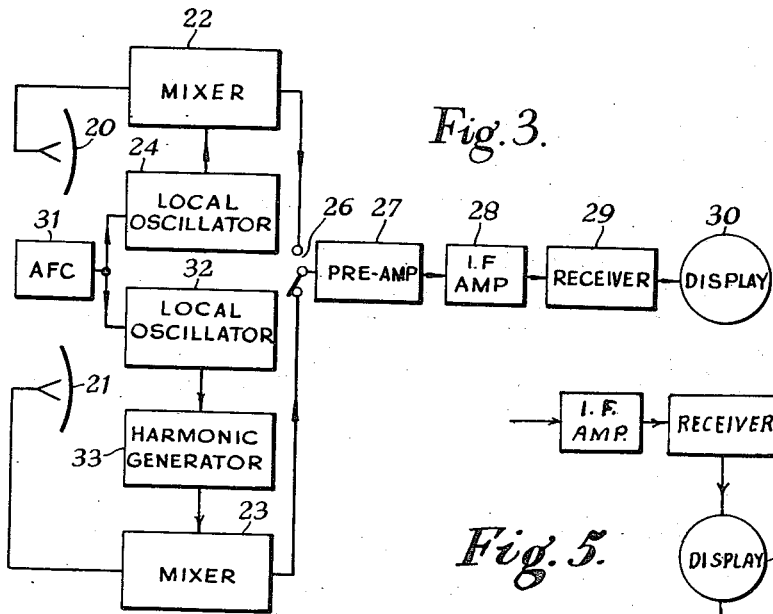

Referring to Figure 1, the transmitter comprises a pulse modulator 10 which may be of conventional construction and which drives a radio frequency oscillator 11, e. g. a magnetron oscillator oscillating on a frequency of, for example, 10,000 mc./s. The output of the oscillator is fed through a waveguide 12 and waveguide switch 13 to a directional antenna system 14. Thus far described, the transmitter constitutes and functions as a conventional pulse radar transmitter. In accordance with the present invention, there is provided, in addition, a harmonic generator 15 to which the output from the oscillator 11 may be applied by means of the switch 13. This harmonic generator conveniently comprises a co-axial line diode, suitably coupled to the waveguide system and which is constructed so as to enhance the output of a particular harmonic, for example, the fourth harmonic of the input frequency. The harmonic generator will thus provide an output of pulse modulated oscillations of a radio frequency which is a multiple of the output frequency of the oscillator 11. The output from the harmonic generator 15 is fed to a directional antenna system 16 through a radio frequency filter 17 which is arranged to transmit signals of the desired harmonic frequency and to reflect or absorb signals of the fundamental frequency or of other undesired harmonic frequencies which may be present in the output of the harmonic generator 15. The antenna system 16 may be the same antenna system as the system 14 used for the signals fed directly from the oscillator 11 or it may be a completely separate antenna system.

The switch 13 may be arranged to feed all the output from the oscillator 11 alternatively to the antenna system 14 or to the harmonic generator 15. In this case the transmitter radiates on one or other of the two alternative frequencies. Alternatively the switch 13 may be a power divider arranged to feed a part of the oscillator output to the antenna system 14 and a part to the harmonic generator 15 so that the transmitter may radiate simultaneously on the two different frequencies. Such power dividers and wave guide switches are well known in the art, being described, for example, by Dr. Price in a paper appearing in the Proceedings of the Electrical Engineers, London, vol. 93, part 3 (a), No. 1, page 37.

In Figure 2 there is illustrated one form of receiver which may be used with the transmitter of Figure 1. Two receiving antennae 20, 21 for the two different radiated frequencies are shown in the figure although, as in the transmitter, there might be used a common antenna with separate feed systems for the two frequencies. As is well known for pulse radar systems, the same antennae may be used both for transmitting and receiving and thus the receiving antennae 20, 21 may also be the transmitting antennae 14 and 16. The signals from the two antennae 20, 21 are fed respectively to crystal mixers 22, 23 where they are mixed with signals generated by local oscillators 24, 25. The frequencies of these two local oscillators are chosen so that both mixers produce output signals of the same frequency which are applied through a switch 26 to a common pre-amplifier 27 where they are amplified before being fed to an intermediate frequency amplifier 28, receiver 29, and finally to a display unit 30. The switch 26 enables selection to be made between the signals of one or other of the two frequencies and operation of this switch should be synchronised with operation of the switch 13 at the transmitter. This may conveniently be accomplished by means of a suitable mechanical interconnection of the switches 13 and 26. A single automatic frequency control unit 31 may be arranged to control the frequencies of both local oscillators. If the transmitter should be arranged to transmit simultaneously on the two different frequencies and it is desired to receive and display simultaneously echoes received on these two frequencies, it would be necessary to duplicate the units 27—30 to provide separate channels for the two sets of signals.

In Figure 3 there is shown a modification of the arrangement of Figure 2 in which, instead of using a local oscillator 25 operating in the frequency band of the higher frequency signals radiated by the transmitting antenna 16, there is used a second local oscillator 32 operating in the band of the lower frequency signals, this second oscillator being coupled to a co-axial line diode harmonic generator 33 to produce the required higher frequency signals which are fed to the mixer 23. Apart from this distinction, the receiver of Figure 3 is the same as the receiver of Figure 2 and similar reference numerals are used to indicate corresponding component units. It will be seen that the arrangement of Figure 3 obviates any necessity to have any valves operating in the higher frequency band except the crystal mixer and harmonic generator and that this arrangement therefore greatly facilitates the use of new frequency bands for radar systems.

Figure 5:
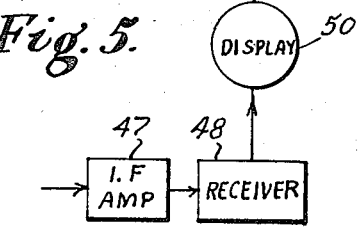
Figure 5 is a block diagram of a modified arrangement of the display apparatus shown in Figure 4.
Figure 4:
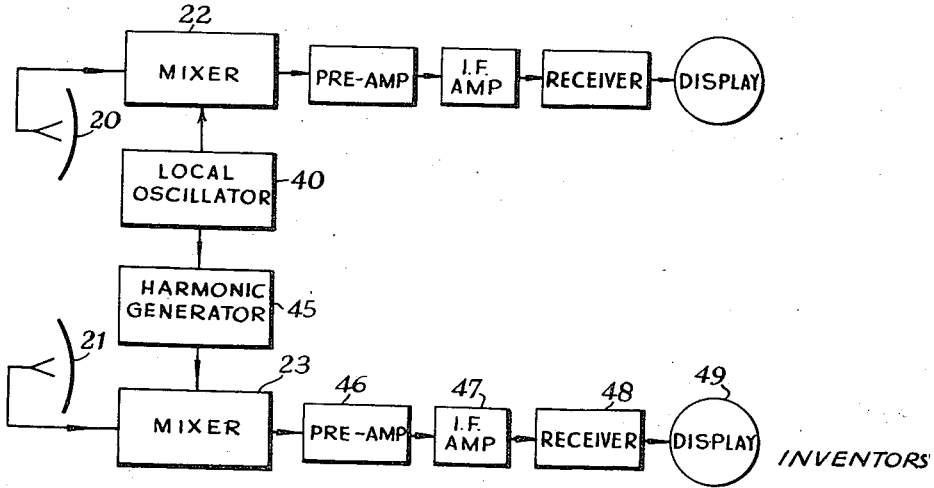

A further arrangement for a receiver is shown in Figure 4 in which the signals from the antennae 20, 21 are fed as before to the mixers 22, 23. In this arrangement, however, only a single local oscillator 40 is provided. This oscillator 40 operates in the lower frequency band and its output is mixed directly with the lower frequency received signals in the mixer 22 to produce an intermediate frequency output which is amplified by the pre-amplifier 41 before being fed to the intermediate frequency amplifier 42, the receiver 43 and the display unit 44. For the higher frequency signals, the output of the local oscillator 40 is fed to a co-axial line diode harmonic generator 45 to produce a higher frequency signal which is mixed in the mixer 23 with the received signals from antenna 23. It will be appreciated that if, for example, the higher frequency signals have a frequency four times that of the lower frequency signals and if the harmonic generator 45 generates the fourth harmonic of the local oscillator frequency, then the intermediate frequency output of the mixer 23 will have a frequency which is four times that of the output of mixer 22. For this reason, a separate pre-amplifier 46, intermediate frequency amplifier 47 and receiver 48 are used for the higher frequency received signals. The output from the receiver 48 may be fed to a display unit 49. Alternatively, however, as is indicated in Figure 5, the outputs from both receivers 43 and 48 may be fed to a common display unit 50 instead of the two separate units 44 and 49. If automatic frequency control is employed, it would be necessary, in this arrangement, to have separate automatic frequency control units for the two receiving channels. It will be seen that the arrangement of Figure 4 only requires one local oscillator and this arrangement therefore minimises the number of radio frequency valves required.

In all the arrangements of receivers described with reference to Figures 2, 3 and 4, a superheterodyne receiving system is employed. It would of course be possible to use, with the transmitter of Figure 1, straight receivers for each of the required frequency bands, the received radio frequency signals being fed to a video detector without any frequency changing stage.

The lower frequency band channels in both the transmitter and receiver could be omitted if it is not desired to operate the system on the frequency directly generated by the oscillator 11. Furthermore, it will be appreciated that separate harmonic generators could be provided for operating on a number of different harmonic frequencies.

Although the invention has been described more particularly with reference to a pulse radar system, it can be applied in a similar manner to a frequency modulated radar system using a continuous wave magnetron oscillator, or any other suitable form of continuous wave oscillator.

We claim:

1. In a radar system, a transmitter comprising a continuous wave oscillator for generating radio frequency signals, a modulator coupled to said oscillator to modulate the output thereof, means coupled to said oscillator for radiating said modulated output, a harmonic generator coupled to the oscillator to be excited by modulated signals so as to produce correspondingly modulated radio frequency signals of a frequency higher than that generated by said oscillator, and radiating means coupled to said harmonic generator for radiating said modulated signals of higher frequency.

2. A radar system comprising an oscillator for generating radio frequency signals, a modulator coupled to said oscillator to modulate the output thereof, a first radiating means coupled to said oscillator for radiating at least part of the modulated output of the oscillator, a harmonic generator, means coupling the harmonic generator to the oscillator for exciting the harmonic generator with at least part of the oscillator output so as to produce correspondingly modulated radio frequency signals of a frequency higher than that generated by said oscillator, a second radiating means coupled to said harmonic generator for radiating said modulated signals of higher frequency, and a receiver for receiving and displaying echoes of said signals radiated by said first and second radiating means.

3. A radar system according to claim 2 wherein said first and said second radiating means comprise a common antenna.

4. A radar system comprising an oscillator for generating radio frequency signals, a modulator coupled to said oscillator to modulate the output thereof, a first radiating means adapted to radiate the modulated output of the oscillator, a harmonic generator adapted when excited by the modulated output of the oscillator to produce correspondingly modulated oscillations of a frequency higher than that generated by said oscillator, a second radiating means coupled to said harmonic generator for radiating said modulated signals of higher frequency, a switch for alternatively coupling said oscillator to said first radiating means or to said harmonic generator, and a receiver for alternatively receiving and displaying echoes of signals radiated either by said first or by said second radiating means.

5. A radar system comprising an oscillator for generating radio frequency signals, a modulator coupled to said oscillator to modulate the output thereof, a first radiating means adapted to radiate the modulated output of the oscillator, a harmonic generator adapted when excited by the modulated output of the oscillator to produce correspondingly modulated oscillations of a frequency higher than that generated by said oscillator, a second radiating means coupled to said harmonic generator for radiating said modulated signals of higher frequency, a switch for alternatively coupling said oscillator to said first radiating means or to said harmonic generator, and a receiving system for alternatively receiving and displaying echoes of signals radiated either by said first or by said second radiating means which receiving system comprises two super-heterodyne receiving channels having separate mixer and intermediate frequency amplifier stages, a common local oscillator for the two channels which oscillator is coupled directly to the mixer for the lower frequency channel, a harmonic generator coupled to said common oscillator to be excited thereby to produce higher frequency oscillations and coupling means coupling said harmonic generator to the mixer for the higher frequency channel.

6. A radar system comprising an oscillator for generating radio frequency signals, a pulse modulator coupled to said oscillator to modulate the output thereof, a first radiating means adapted to radiate the modulated output of the oscillator, a harmonic generator adapted when excited by the pulse modulated output of the oscillator to produce correspondingly modulated oscillations of a frequency higher than that generated by said oscillator, a second radiating means coupled to said harmonic generator for radiating said modulated signals of higher frequency, a switch for alternatively coupling said oscillator to said first radiating means or to said harmonic generator, and a receiver having two radio frequency receiving channels with a common display unit for alternatively receiving and displaying received echo signals either of the frequency of said oscillator or of said higher frequency.

7. A radar system comprising an oscillator for generating radio frequency signals, a frequency modulation modulator coupled to said oscillator to modulate the output thereof, a first radiating means adapted to radiate the modulated output of the oscillator, a harmonic generator adapted when excited by the frequency modulated output of the oscillator to produce correspondingly modulated oscillations of a frequency higher than that generated by said oscillator, a second radiating means coupled to said harmonic generator for radiating said modulated signals of higher frequency, a switch for alternatively coupling said oscillator to said first radiating means or to said harmonic generator and a receiver having two radio frequency receiving channels with a common display unit for alternatively receiving and displaying received echo signals either of the frequency of said oscillator or of said higher frequency.

8. In a radar system, a transmitter comprising an oscillator for generating radio frequency signals, a modulator coupled to said oscillator to modulate the output thereof, a first radiating means coupled to said oscillator, a harmonic generator, means coupling the harmonic generator to the oscillator for exciting the harmonic generator with at least a part of the oscillator output so as to produce correspondingly modulated radio frequency signals of a frequency higher than that generated by said oscillator, and a second radiating means coupled to said harmonic generator for radiating said modulated signals of higher frequency.

9. In a radar system, a transmitter comprising an oscillator for generating radio frequency signals, a pulse modulator coupled to said oscillator to modulate the output thereof, a first radiating means adapted to radiate the modulated output of the oscillator, a harmonic generator adapted when excited by the pulse modulated output of the oscillator to produce correspondingly modulated oscillations of a frequency higher than that generated by said oscillator, a second radiating means coupled to said harmonic generator for radiating said modulated signals of higher frequency, and a switch for alternatively coupling said oscillator to said first radiating means or to said harmonic generator.

10. A radar system comprising a continuous wave oscillator for generating radio frequency signals, a modulator coupled to said oscillator to modulate the output thereof, first radiating means coupled to said oscillator for radiating said modulated output, a harmonic generator coupled to the oscillator to be excited by said modulated output so as to produce correspondingly modulated radio frequency signals of a frequency higher than that generated by said oscillator, second radiating means coupled to said harmonic generator for radiating said modulated signals of higher frequency, and a receiver for alternatively receiving and displaying echoes of signals radiated either by said first or by said second radiating means.

References Cited in the file of this patent

UNITED STATES PATENTS

| | | |
|---|---|---|
| 2,063,248 | Hansell | Dec. 8, 1936 |
| 2,321,315 | Peterson et al. | June 8, 1943 |
| 2,380,868 | Peterson | July 31, 1945 |
| 2,422,079 | Carlson et al. | June 10, 1947 |
| 2,457,396 | Pollard | Dec. 28, 1948 |
| 2,460,109 | Southworth | Jan. 25, 1949 |
| 2,524,610 | Storm et al. | Oct. 3, 1950 |
| 2,582,185 | Willshaw | Jan. 8, 1952 |
| 2,593,071 | Sunstein et al. | Apr. 15, 1952 |
| 2,597,636 | Hall et al. | May 20, 1952 |
| 2,614,250 | Stodola | Oct. 14, 1952 |
| 2,637,782 | Magnuski | May 5, 1953 |
| 2,684,478 | Fox | July 20, 1954 |
| 2,712,646 | Lawson | July 5, 1955 |